US010038847B2

(12) United States Patent
Matsuoka

(10) Patent No.: US 10,038,847 B2
(45) Date of Patent: Jul. 31, 2018

(54) IMAGE PROCESSING TECHNIQUE FOR GENERATING MORE APPROPRIATE MOTION VECTORS FOR A CAPTURED IMAGE THAT IS DISTORTED

(71) Applicant: CANON KABUSHIKI KAISHA, Tokyo (JP)

(72) Inventor: Masaaki Matsuoka, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 220 days.

(21) Appl. No.: 15/096,458

(22) Filed: Apr. 12, 2016

(65) Prior Publication Data
US 2016/0301870 A1    Oct. 13, 2016

(30) Foreign Application Priority Data

Apr. 13, 2015 (JP) ................. 2015-082060

(51) Int. Cl.
*H04N 5/232* (2006.01)
*G06T 7/20* (2017.01)

(52) U.S. Cl.
CPC ..... *H04N 5/23254* (2013.01); *H04N 5/23238* (2013.01); *H04N 5/23267* (2013.01); *G06T 7/20* (2013.01)

(58) Field of Classification Search
CPC ........... H04N 5/23251; H04N 5/23254; H04N 5/23267; H04N 5/23238; H04N 5/23248; H04N 5/23264; G06T 7/20
See application file for complete search history.

(56) References Cited

U.S. PATENT DOCUMENTS

| 5,185,667 | A | * | 2/1993 | Zimmermann | ....... G06T 3/0018 348/143 |
| 7,821,540 | B2 | | 10/2010 | Kurata | |
| 8,284,258 | B1 | * | 10/2012 | Cetin | ..................... H04N 7/183 348/169 |

(Continued)

FOREIGN PATENT DOCUMENTS

| JP | H06-501585 A | 2/1994 |
| JP | 2007-221631 A | 8/2007 |

(Continued)

*Primary Examiner* — Twyler Haskins
*Assistant Examiner* — Akshay Trehan
(74) *Attorney, Agent, or Firm* — Fitzpatrick, Cella, Harper & Scinto

(57) ABSTRACT

A generation unit generates N distortion corrected images (N≥2) by performing coordinate conversion on each of N partial areas of a first captured image, using a conversion parameter that depends on a position of the partial area, and generates N distortion corrected images by performing coordinate conversion on each of corresponding N partial areas of a second captured image, using a conversion parameter that depends on a position of the partial area. A detection unit detects N motion vectors by comparing each of the N distortion corrected images generated from the first captured image with the corresponding distortion corrected image generated from the second captured image. A conversion unit generates N converted motion vectors by performing inverse coordinate conversion on each of the N motion vectors using a conversion parameter that depends on a position of the corresponding partial area.

9 Claims, 5 Drawing Sheets

(56) References Cited

U.S. PATENT DOCUMENTS

| | | |
|---|---|---|
| 8,446,957 B2 | 5/2013 | Kurata |
| 2005/0196068 A1* | 9/2005 | Kawai .................. H04N 5/2254 382/276 |
| 2005/0206739 A1* | 9/2005 | Kamoshida ............. G06T 5/006 348/208.99 |
| 2008/0151064 A1* | 6/2008 | Saito .................. H04N 5/23248 348/208.4 |
| 2008/0218606 A1* | 9/2008 | Yoda ...................... H04N 5/217 348/241 |
| 2009/0128700 A1* | 5/2009 | Oshino ............. H04N 5/23248 348/580 |
| 2010/0033584 A1* | 2/2010 | Watanabe ............. G06T 3/0062 348/208.13 |
| 2010/0034428 A1* | 2/2010 | Fukunishi .......... H04N 5/23254 382/107 |
| 2010/0182441 A1* | 7/2010 | Fukumoto .......... H04N 5/23248 348/208.4 |
| 2011/0019880 A1* | 1/2011 | Yoshino ............. H04N 5/23248 382/107 |
| 2012/0281922 A1* | 11/2012 | Yamada ............. H04N 5/23254 382/201 |
| 2014/0046131 A1* | 2/2014 | Morita ............... A61B 1/00179 600/109 |

FOREIGN PATENT DOCUMENTS

| | | |
|---|---|---|
| JP | 2009-258868 A | 11/2009 |
| WO | 92/021208 A1 | 11/1992 |

* cited by examiner

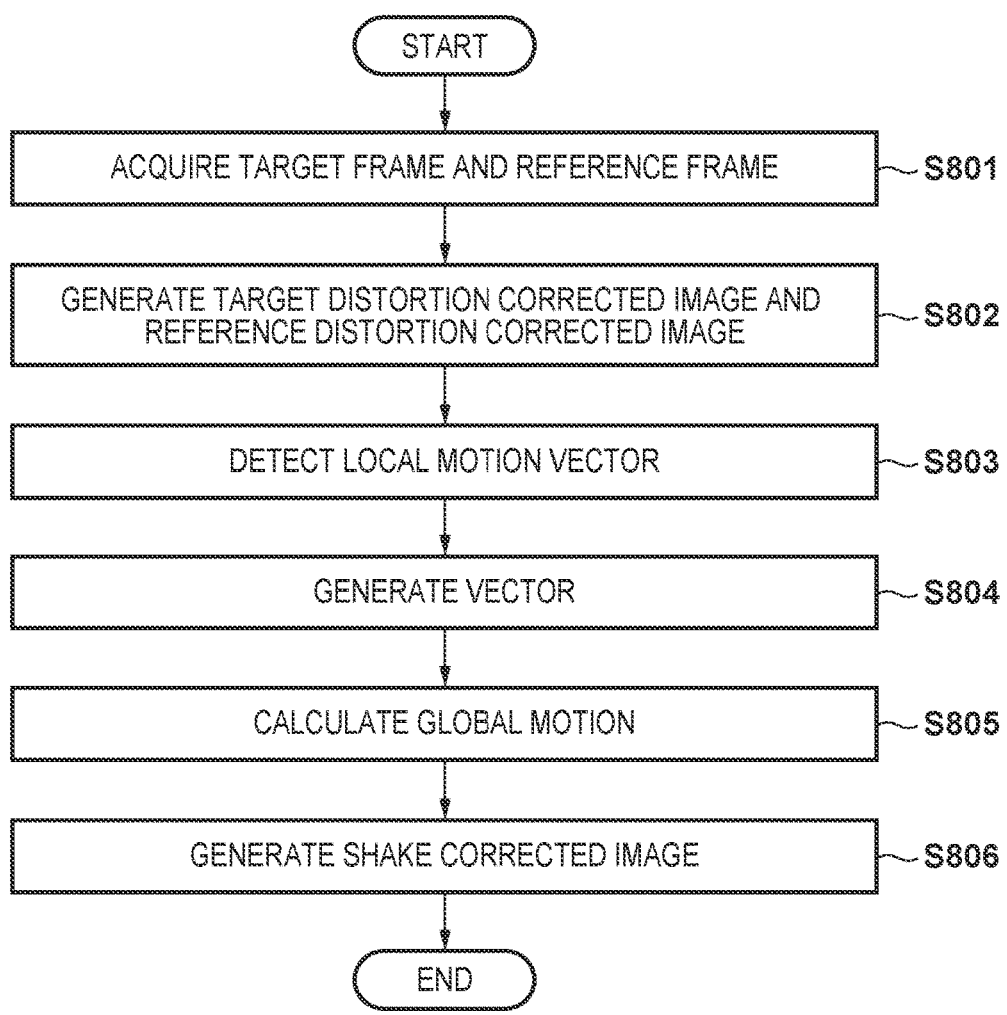

IMAGE PROCESSING TECHNIQUE FOR GENERATING MORE APPROPRIATE MOTION VECTORS FOR A CAPTURED IMAGE THAT IS DISTORTED

BACKGROUND OF THE INVENTION

Field of the Invention

The present invention relates to an image processing apparatus, an image capturing apparatus, a control method of the image processing apparatus, and a storage medium.

Description of the Related Art

Conventionally, omnidirectional cameras capable of shooting 360 degree (omnidirectional) images are known. For example, Japanese Patent Laid-Open No. 6-501585 discloses a technique for converting a hemispherical field-of-view image (omnidirectional image) into a normal perspective image that is not distorted at an arbitrary orientation (direction), rotation and magnification within the field of view. According to Japanese Patent Laid-Open No. 6-501585, a subject image at an arbitrary position in a visual field space within a hemispherical field of view can be provided as a moving image without moving a mechanical panning/tilting mechanism. In addition, among the above parameters (orientation (direction), rotation, and magnification), magnification corresponds to a focal distance at the time of image conversion. In other words, decreasing the magnification enables the actual focal distance to be shortened, making it possible to cover a wide angle of view. In general, when attempting to cover a wide angle of view, a phenomenon occurs in which the enlargement amount of the subject image varies between an area positioned at the periphery of the hemispherical field of view and an area positioned at the center.

In addition, Japanese Patent Laid-Open No. 6-501585 discloses a fixed-type camera apparatus to which the above technique is applied, but the above technique can also be applied to the case where a camera apparatus is installed in a vehicle or worn by a person as a wearable apparatus. In such cases, there is a possibility that shake of the camera apparatus caused by the vehicle or the person will occur.

There are conventionally known techniques regarding moving image shake correction. For example, Japanese Patent Laid-Open No. 2007-221631 discloses a technique for performing shake correction by detecting motion vectors in captured images in units of screens from captured image data, and shifting a position for reading out captured image data stored in an image memory based on these motion vectors. In addition, Japanese Patent Laid-Open No. 2009-258868 discloses a technique for calculating a global motion indicating the movement of the entire image between two screens using a large number of local motion vectors. Specifically, a motion vector (local motion vector) is detected for each of a large number of target blocks set in the screen, and the global motion is calculated as an affine transformation matrix using the motion vectors.

In a hemispherical field-of-view image, a large amount of distortion occurs particularly in the peripheral area, and therefore shapes vary in accordance with position even with the same subject. Therefore, in the case of detecting local motion vectors for the hemispherical field-of-view image, there is a possibility that the accuracy of block matching processing (processing for detecting highly correlated blocks between two screens) will deteriorate as the subject moves, and that the accuracy of detecting the local motion vectors will deteriorate. In view of this, it is conceivable to correct the distortion by converting the target blocks of the hemispherical field-of-view image in accordance with the technique of Japanese Patent Laid-Open No. 6-501585.

However, in the case of performing distortion correction, the enlargement amount of the subject image varies in accordance with the position in the hemispherical field-of-view image. Also, the movement direction of the subject in a distortion corrected image does not necessarily match the movement direction of the same subject in the hemispherical field-of-view image (before the distortion correction). Therefore, even if the actual movement amount and the movement direction of the subject are the same, there is a possibility that local motion vectors having a size and orientation that vary in accordance with the position of the target block are detected. That is, the local motion vectors detected in the hemispherical field-of-view image in accordance with the techniques of Japanese Patent Laid-Open No. 6-501585 and Japanese Patent Laid-Open No. 2009-258868 do not appropriately reflect the movement of the subject in the hemispherical field-of-view image (before distortion correction) in some cases. This problem can similarly occur to varying degrees in a captured image having an angle of view narrower than the angle of view of the hemispherical field-of-view image.

SUMMARY OF THE INVENTION

The present invention has been made in consideration of the aforementioned situations, and provides a technique for generating more appropriate motion vectors for a captured image that is distorted.

According to a first aspect of the present invention, there is provided an image processing apparatus comprising: an acquisition unit configured to acquire a first captured image and a second captured image generated by photo-electrically converting a subject image formed by an optical system; a generation unit configured to generate N distortion corrected images (N is an integer greater than or equal to 2) by performing coordinate conversion on each of N partial areas of the first captured image, using a conversion parameter that depends on a position of the partial area, and to generate N distortion corrected images by performing coordinate conversion on each of corresponding N partial areas of the second captured image, using a conversion parameter that depends on a position of the partial area; a detection unit configured to detect N motion vectors by comparing each of the N distortion corrected images generated from the first captured image with the corresponding distortion corrected image generated from the second captured image; and a conversion unit configured to generate N converted motion vectors by performing inverse coordinate conversion on each of the N motion vectors, using a conversion parameter that depends on a position of the corresponding partial area.

According to a second aspect of the present invention, there is provided an image capturing apparatus comprising: an acquisition unit configured to acquire a first captured image and a second captured image generated by photo-electrically converting a subject image formed by an optical system; a generation unit configured to generate N distortion corrected images (N is an integer greater than or equal to 2) by performing coordinate conversion on each of N partial areas of the first captured image, using a conversion parameter that depends on a position of the partial area, and to generate N distortion corrected images by performing coordinate conversion on each of corresponding N partial areas of the second captured image, using a conversion parameter that depends on a position of the partial area; a detection unit configured to detect N motion vectors by comparing each of the N distortion corrected images generated from the first captured image with the corresponding distortion corrected image generated from the second captured image; a conversion unit configured to generate N converted motion vectors by performing inverse coordinate conversion on each of the N motion vectors, using a conversion parameter that depends on a position of the corresponding partial area; and an image capturing unit configured to photo-electrically convert a subject image formed by the optical system.

According to a third aspect of the present invention, there is provided a control method of an image processing apparatus, comprising: acquiring a first captured image and a second captured image generated by photo-electrically converting a subject image formed by an optical system; generating N distortion corrected images (N is an integer greater than or equal to 2) by performing coordinate conversion on each of N partial areas of the first captured image, using a conversion parameter that depends on a position of the partial area; generating N distortion corrected images by performing coordinate conversion on each of corresponding N partial areas of the second captured image, using a conversion parameter that depends on a position of the partial area; detecting N motion vectors by comparing each of the N distortion corrected images generated from the first captured image with the corresponding distortion corrected image generated from the second captured image; and generating N converted motion vectors by performing inverse coordinate conversion on each of the N motion vectors, using a conversion parameter that depends on a position of the corresponding partial area.

According to a fourth aspect of the present invention, there is provided a non-transitory computer-readable storage medium which stores a program for causing a computer to execute a control method comprising: acquiring a first captured image and a second captured image generated by photo-electrically converting a subject image formed by an optical system; generating N distortion corrected images (N is an integer greater than or equal to 2) by performing coordinate conversion on each of N partial areas of the first captured image, using a conversion parameter that depends on a position of the partial area; generating N distortion corrected images by performing coordinate conversion on each of corresponding N partial areas of the second captured image, using a conversion parameter that depends on a position of the partial area; detecting N motion vectors by comparing each of the N distortion corrected images generated from the first captured image with the corresponding distortion corrected image generated from the second captured image; and generating N converted motion vectors by performing inverse coordinate conversion on each of the N motion vectors, using a conversion parameter that depends on a position of the corresponding partial area.

Further features of the present invention will become apparent from the following description of exemplary embodiments with reference to the attached drawings.

BRIEF DESCRIPTION OF THE DRAWINGS

FIG. 8 is a flowchart of shake corrected image generation processing executed by the digital camera 100.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

Figure 1:
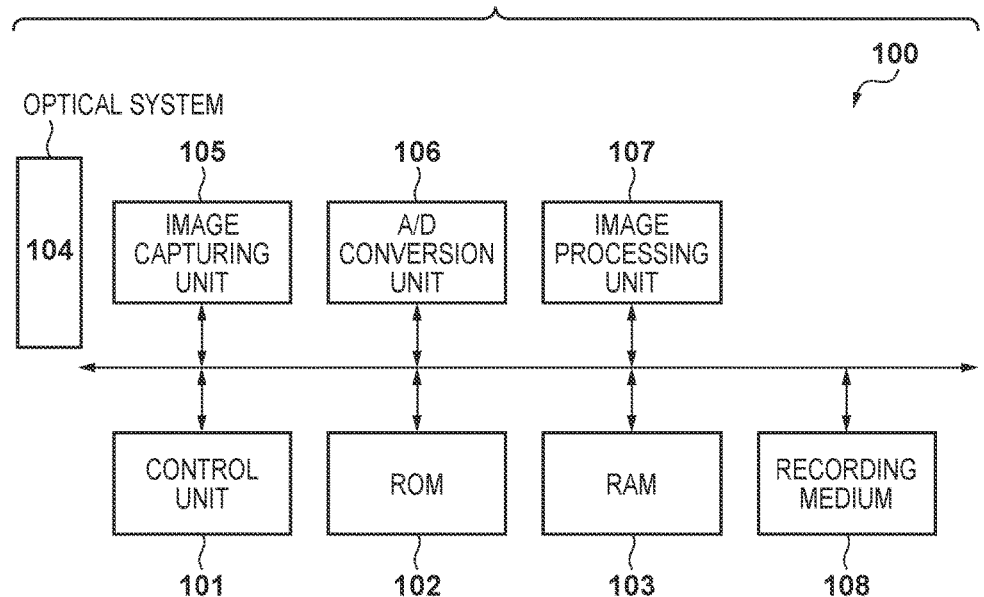
FIG. 1 is a block diagram showing a functional configuration of a digital camera 100 according to a first embodiment.

An embodiment will be described, in which an image processing apparatus according to the present invention is applied to a digital camera. FIG. 1 is a block diagram showing the functional configuration of a digital camera 100 according to a first embodiment. In the following description, it is assumed that the digital camera 100 is capable of shooting circular images (hemispherical field-of-view images) corresponding to a hemispherical field of view. However, this embodiment is not limited thereto, and the digital camera 100 may be constituted to shoot images with a narrower angle of view than the angle of view of the hemispherical field-of-view image.

In FIG. 1, a control unit 101 is a CPU, for example, and controls the operations of the blocks of the digital camera 100 by reading an operation program for each of the blocks of the digital camera 100 from a ROM 102, expanding the program in a RAM 103 and executing the program. The ROM 102 is a rewritable nonvolatile memory, and stores parameters and the like necessary for the operations of the blocks, in addition to the operation programs of the blocks of the digital camera 100. The RAM 103 is a rewritable volatile memory, and is used as a temporary storage area for data that was output in the operations of the blocks of the digital camera 100.

An optical system 104 is an optical system constituted by a fish eye lens and the like, and forms a circular omnidirectional image in an image capturing unit 105. The image capturing unit 105 is an image sensor such as a CCD or a CMOS sensor, and photo-electrically converts an optical image formed in the image sensor by the optical system 104, and outputs an obtained analog image signal to an A/D conversion unit 106. The A/D conversion unit 106 applies A/D conversion processing to the input analog image signal, and outputs obtained digital image data to the RAM 103 and stores the digital image data therein.

An image processing unit 107 detects, in the image data stored in the RAM 103, a motion vector for each screen of the image, and shifts a reading position of the image data stored in the RAM 103 based on this motion vector so as to perform shake correction. A recording medium 108 is a removable memory card or the like, and images processed by the image processing unit 107 and stored in the RAM 103, and images A/D converted by the A/D conversion unit 106, and the like are recorded as recorded images.

Figure 2:
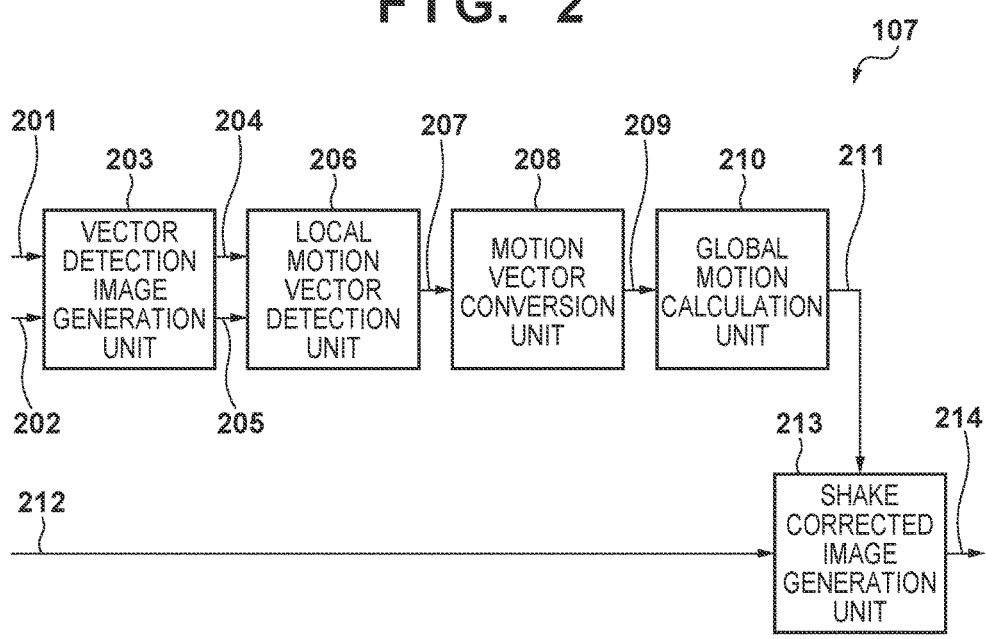
FIG. 2 is a diagram showing a detailed configuration of an image processing unit 107.

FIG. 2 is a diagram showing the detailed configuration of the image processing unit 107 in FIG. 1. In FIG. 2, a current frame (in this embodiment, a hemispherical field-of-view image), namely, a target frame 201 (first captured image) and the next frame, namely, a reference frame 202 (second captured image) are input to a vector detection image generation unit 203. The vector detection image generation unit 203 generates, as images for detecting a local motion vector, images that have undergone distortion correction from a plurality of areas of the input frame, in accordance with the technique of Japanese Patent Laid-Open No. 6-501585.

Figure 7:
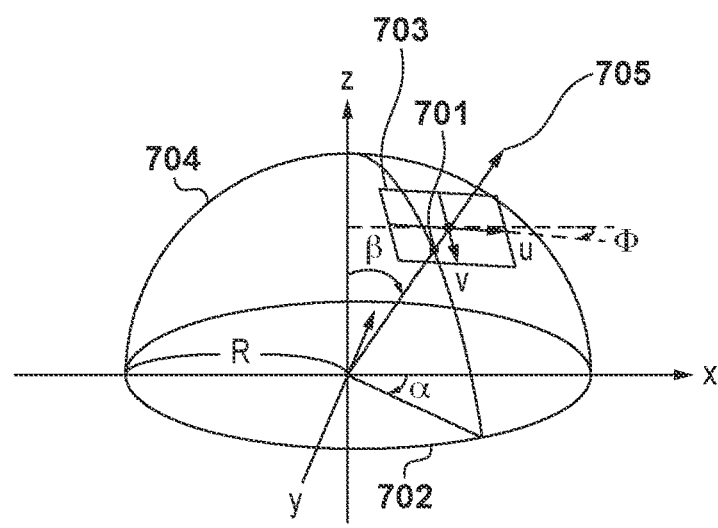
FIG. 7 is a diagram for describing a relationship between a coordinate system of a hemispherical field-of-view image and a coordinate system of a distortion corrected image.

Here, processing for generating a distortion corrected image from a hemispherical field-of-view image will be described with reference to FIG. 7. FIG. 7 is a diagram for describing the relationship between the coordinate system of the hemispherical field-of-view image and the coordinate system of the distortion corrected image. In FIG. 7, a reference numeral 704 denotes a hemispherical surface, a reference numeral 702 denotes the xy coordinate system of the hemispherical field-of-view image, and a reference numeral 703 denotes the uv coordinate system of the distortion corrected image. The z axis is an axis orthogonal to the xy plane. R is the radius of a hemispherical surface 704 (the radius of the circular hemispherical field-of-view image), α is an azimuth angle, β is a zenith angle, φ is a rotation angle, and a reference numeral 705 denotes a field of view vector defined by the azimuth angle α and the zenith angle β. A reference numeral 701 denotes the intersection between the hemispherical surface 704 and the field of view vector 705.

Figure 3:
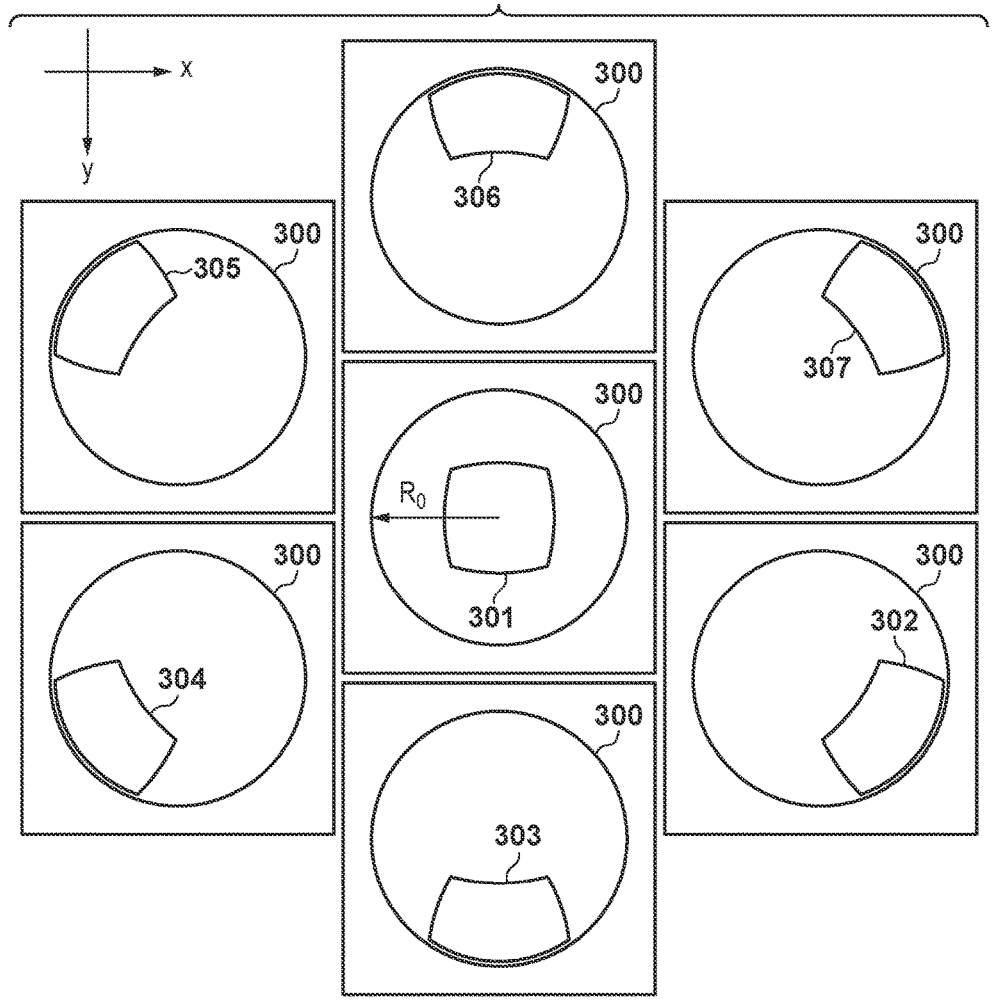
FIG. 3 is a diagram for describing generation of distortion corrected images (images for detecting a local motion vector) by a vector detection image generation unit 203.

The relationship between the xy coordinate system and the uv coordinate system in FIG. 7 is specified by the following expressions (1) and (2). The distortion corrected image can be generated by obtaining a point (x, y) in the hemispherical field-of-view image corresponding to a point (u, v) in the distortion corrected image in accordance with the expressions (1) and (2), and obtaining corresponding pixel values from the hemispherical field-of-view image.

$$x = \frac{R[uA - vB + mR\sin\beta\sin\alpha]}{\sqrt{u^2 + v^2 + m^2 R^2}} \quad (1)$$

$$y = \frac{R[uC - vD + mR\sin\beta\cos\alpha]}{\sqrt{u^2 + v^2 + m^2 R^2}} \quad (2)$$

where
A=(cos φ cos α−sin φ sin α cos β),
B=(sin φ cos α+cos φ sin α cos β),
C=(cos φ sin α+sin φ cos α cos β),
D=(sin φ sin α−cos φ cos α cos β), and
m=magnification Next, the generation of distortion corrected images (images for detecting a local motion vector) by the vector detection image generation unit 203 will be described with reference to FIGS. 3 and 4. In FIG. 3, a reference numeral 300 denotes the entire area of a hemispherical field-of-view image, and the radius of the hemispherical field-of-view image is $R_0$. The vector detection image generation unit 203 reads out images from seven partial areas (readout areas 301 to 307) in FIG. 3, in the hemispherical field-of-view image. Specifically, the vector detection image generation unit 203 reads out the image from fixed readout areas 301 to 307 regarding each of the target frame 201 and the reference frame 202. The azimuth angle α, zenith angle β, rotation angle φ, and magnification m of each of the readout areas are as shown in a table in FIG. 3. Note that in this embodiment, description will be given assuming that the readout areas 301 to 307 are fixed areas, but this embodiment is not limited thereto.

Figure 4:
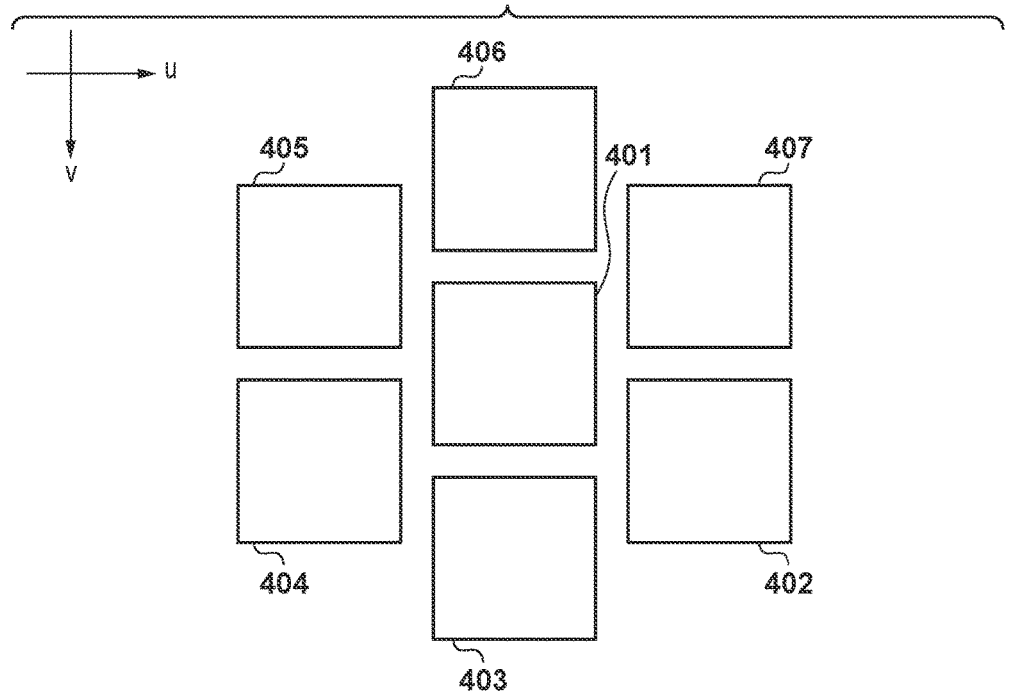
FIG. 4 is a diagram for describing distortion corrected images generated by the vector detection image generation unit 203.

The vector detection image generation unit 203 outputs a distortion corrected image corresponding to the readout area 301 as a distortion corrected image 401 shown in FIG. 4. Specifically, the vector detection image generation unit 203 obtains, using the expressions (1) and (2) described with reference to FIG. 7, a point (x, y) in the hemispherical field-of-view image 300 corresponding to a point (u, v) in the distortion corrected image 401, and reads out a corresponding pixel value in the readout area 301. Accordingly, the distortion corrected image 401 corresponding to the readout area 301 is generated. Similarly, the vector detection image generation unit 203 outputs distortion corrected images corresponding to the readout areas 302 to 307 as distortion corrected images 402 to 407 shown in FIG. 4.

In this manner, the generation of a distortion corrected image is performed by coordinate conversion from the xy coordinate system into the uv coordinate system using conversion parameters including the azimuth angle α and the like. As seen from FIG. 3, the conversion parameters vary in accordance with the position of the readout area. In addition, in this embodiment, description is given assuming that the magnification m is 1 regarding all of the readout areas 301 to 307, although the value of the magnification m may vary for each of the readout areas. In this case, the conversion parameters will vary in accordance with the position and size of the readout area.

Note that in this embodiment, description is given assuming that the number of the readout areas is seven, but the number of the readout areas is not limited to seven. To generalize, the number of the readout areas is N (N is an integer greater than or equal to 2).

Referring to FIG. 2 again, the vector detection image generation unit 203 outputs a target distortion corrected image 204 and a reference distortion corrected image 205 to a local motion vector detection unit 206. The target distortion corrected image 204 corresponds to the distortion corrected images 401 to 407 generated from the target frame 201, and the reference distortion corrected image 205 corresponds to the distortion corrected images 401 to 407 generated from the reference frame 202. The local motion vector detection unit 206 detects seven local motion vectors corresponding to the distortion corrected images 401 to 407 by comparing the target distortion corrected image 204 and the reference distortion corrected image 205. As block matching processing for detecting the local motion vectors, for example, the technique disclosed in Japanese Patent Laid-Open No. 2009-258868 can be used.

Figure 5:
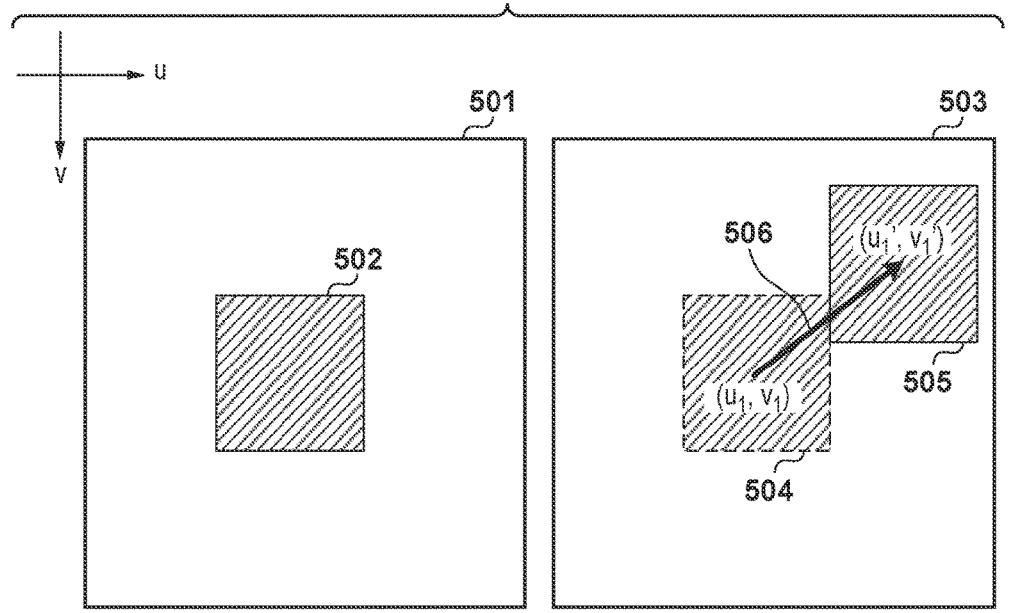
FIG. 5 is a diagram for describing processing for detecting a local motion vector by block matching processing.

FIG. 5 is a diagram for describing processing for detecting a local motion vector by block matching processing. In FIG. 5, a reference numeral 501 denotes one target distortion corrected image (here, the distortion corrected image 401 generated from the target frame 201), and a reference numeral 503 denotes a corresponding reference distortion corrected image. A reference numeral 502 denotes a target block, a reference numeral 505 denotes a motion compensation block, which is a reference block whose correlation with a target block 502 is the highest. A reference numeral 504 denotes a projection image block of the target block 502 in a reference distortion corrected image 503. A reference numeral 506 denotes a local motion vector corresponding to a position shift amount between the position $(u_1, v_1)$ of a projection image block 504 and the position $(u_1', v_1')$ of the motion compensation block 505. That is, the local motion vector corresponding to the distortion corrected image 401 is detected as $(u_1, v_1) \rightarrow (u_1', v_1')$. Similarly, the local motion vectors corresponding to the distortion corrected images 402 to 407 are detected as $(u_2, v_2) \rightarrow (u_2', v_2')$, $(u_3, v_3) \rightarrow (u_3', v_3')$, . . . , $(u_7, v_7) \rightarrow (u_7', v_7')$.

Referring to FIG. 2 again, the local motion vector detection unit 206 outputs local motion vectors 207 to a motion vector conversion unit 208. The local motion vectors 207 correspond to the seven local motion vectors detected based on the distortion corrected images 401 to 407. Note that these seven local motion vectors are affected by the influence of distortion correction and accompanying enlargement of the subject image, and the size and orientation references are not in common. In view of this, the motion vector conversion unit 208 converts the local motion vectors 207 corresponding to the uv coordinate system of the distortion corrected image into the xy coordinate system of the hemispherical field-of-view image, thereby removing the influence of distortion correction. Specifically, the motion vector conversion unit 208 respectively converts $(u_1, v_1)$ and $(u_1', v_1')$ into $(x_1, y_1)$ and $(x_1', y_1')$, using the expression (1) and the expression (2) described with reference to FIG. 7. Thereby, a converted motion vector $(x_1, y_1) \rightarrow (x_1', y_1')$ corresponding to the readout area 301 in FIG. 3 is generated. Similarly, converted motion vectors $(x_2, y_2) \rightarrow (x_2', y_2')$, $(x_3, y_3) \rightarrow (x_3', y_3')$, . . . , $(x_7, y_7) \rightarrow (x_7', y_7')$ are respectively generated for the readout areas 302 to 307 in FIG. 3. In this manner, the motion vector conversion unit 208 generates converted motion vectors by performing inverse coordinate conversion using the conversion parameters that depend on the positions of the readout areas (coordinate conversion that is the inverse to coordinate conversion that is executed by the vector detection image generation unit 203). The motion vector conversion unit 208 outputs the generated seven converted motion vectors (converted motion vectors 209) to a global motion calculation unit 210.

The global motion calculation unit 210 calculates a global motion as an affine transformation matrix from the converted motion vectors 209. As a method for calculating the affine transformation matrix, the method disclosed in Japanese Patent Laid-Open No. 2009-258868 can be used. A general expression of affine transformation is shown below as an expression (3)

$$\begin{bmatrix} v \\ w \end{bmatrix} = \begin{bmatrix} a & b & c \\ d & e & f \end{bmatrix} \begin{bmatrix} x \\ y \\ 1 \end{bmatrix} = \begin{bmatrix} a \cdot x + b \cdot y + c \\ d \cdot x + e \cdot y + f \end{bmatrix} \quad (3)$$

In the above expression, x and y respectively indicate the horizontal component and the vertical component of the center coordinate of a target block. Also, v indicates the horizontal component (x'-x) of the motion vector of the target block, w indicates a vertical component (y'-y) of the motion vector of the target block, and a, b, c, d, e, and f indicate affine parameters. In normal affine transformation, the affine parameters a, b, c, d, e, and f are fixed values.

A motion vector that depends on the global motion (this vector is referred to as an ideal motion vector) is obtained from the affine parameters obtained in a global motion convergence calculation process, and the center coordinates of the target blocks. The sum ε of errors between the ideal vector and the observed motion vector (detected by block matching) is expressed as follows:

$$V_n = \begin{bmatrix} a & b & c \\ d & e & f \end{bmatrix} \begin{bmatrix} x_n \\ y_n \\ 1 \end{bmatrix} \quad (4)$$

$$\varepsilon_n^2 = \left| V_n - \begin{bmatrix} v_n \\ w_n \end{bmatrix} \right|^2 \quad (5)$$

$$\varepsilon^2 = \sum \varepsilon_n^2 = \sum \{(a \cdot x_n + b \cdot y_n + c - v_n)^2 + (d \cdot x_n + e \cdot y_n + f - w_n)^2\} \quad (6)$$

where
$x_n$=horizontal component of center coordinate of each block n,
$y_n$=vertical component of center coordinate of each block n,
$v_n$=horizontal component of motion vector of each block n=$(x_n'-x_n)$,
$w_n$=vertical component of motion vector of each block n=$(y_n'-y_n)$
$V_n$=theoretical vector in each block n obtained by affine transformation,
$\varepsilon_n$=error (distance) between motion vector and theoretical vector in each block n, and
$\varepsilon$=sum of $\varepsilon_n$ A proposition of deriving a global motion is an estimation of affine parameters a to f for minimizing the above-described sum ε of errors, and this can be solved by a least squares method, for example. A process to derive the affine parameters a to f, and the results are expressed as follows, such that from $\frac{\partial \varepsilon^2}{\partial a} = 0$, $\frac{\partial \varepsilon^2}{\partial b} = 0$, $\frac{\partial \varepsilon^2}{\partial c} = 0$, $$a \cdot x2 + b \cdot xy + c \cdot x = vx, \quad (7-1)$$

$$a \cdot xy + b \cdot y2 + c \cdot y = vy, \text{ and} \quad (7-2)$$

$$a \cdot x + b \cdot y + c \cdot n = v \quad (7-3)$$

are obtained.
In the above expressions,
n=total number of blocks
x2=Σx²
xy=Σxy
y2=Σy²
x=Σx
y=Σy
vx=Σvx
vy=Σvy
v=Σv In addition, from the expressions (7-1), (7-2), and (7-3), the following expressions are obtained:

$$a = \frac{(n \cdot y2 - y^2)(n \cdot vx - v \cdot x) - (n \cdot xy - x \cdot y)(n \cdot vy - v \cdot y)}{(n \cdot x2 - x^2)(n \cdot y2 - y^2) - (n \cdot xy - x \cdot y)^2} \quad (8)$$

$$b = \frac{(n \cdot xy - x \cdot y)(n \cdot vx - v \cdot x) - (n \cdot x2 - x^2)(n \cdot vy - v \cdot y)}{(n \cdot xy - x \cdot y)^2 - (n \cdot x2 - x^2) - (n \cdot y2 - y^2)} \quad (9)$$

-continued $$c = \frac{\begin{array}{l}(x \cdot y2 - xy \cdot y)(x \cdot vx - v \cdot x2) - \\ (xy \cdot x - x2 \cdot y)(vy \cdot x - v \cdot xy)\end{array}}{\begin{array}{l}(n \cdot y2 - xy \cdot y)(x2 - n \cdot x2) - \\ (xy \cdot x - x2 \cdot y)(x \cdot y - n \cdot xy)\end{array}} \quad (10)$$

$$d = \frac{\begin{array}{l}(n \cdot y2 - y^2)(n \cdot wx - w \cdot x) - \\ (n \cdot xy - x \cdot y)(n \cdot wy - w \cdot y)\end{array}}{(n \cdot x2 - x^2)(n \cdot y2 - y^2) - (n \cdot xy - x \cdot y)^2} \quad (11)$$

$$e = \frac{\begin{array}{l}(n \cdot xy - x \cdot y)(n \cdot wx - w \cdot x) - \\ (n \cdot x2 - x^2)(n \cdot wy - w \cdot y)\end{array}}{(n \cdot xy - x \cdot y)^2 - (n \cdot x2 - x^2)(n \cdot y2 - y^2)} \quad (12)$$

$$f = \frac{\begin{array}{l}(x \cdot y2 - xy \cdot y)(x \cdot wx - w \cdot x2) - \\ (xy \cdot x - x2 \cdot y)(wy \cdot x - w \cdot xy)\end{array}}{\begin{array}{l}(n \cdot y2 - xy \cdot y)(x2 - n \cdot x2) - \\ (xy \cdot x - x2 \cdot y)(x \cdot y - n \cdot xy)\end{array}} \quad (13)$$

wherein
wx=Σwx
wy=Σwy, and
w=Σw

As shown in FIG. 2, the global motion calculation unit 210 outputs a calculated global motion 211 to the shake corrected image generation unit 213. The shake corrected image generation unit 213 performs shake correction by shifting a position for reading out image data based on the global motion 211. In this embodiment, the next frame, namely, the reference frame 212 is input to the global motion calculation unit 210.

A readout area of the reference frame 212 that is to be read by the shake corrected image generation unit 213 will be described with reference to FIG. 6. A reference numeral 600 denotes the entire area of a hemispherical field-of-view image, a reference numeral 601 denotes a readout area of the current frame (first partial area), and a reference numeral 602 denotes a readout area of the reference frame 212 (second partial area). A readout area 602 is a movement destination of a readout area 601 identified from the global motion 211 calculated based on affine transformation of the converted motion vectors 209. The azimuth angle α and zenith angle β in the expression (1) and the expression (2) described with reference to FIG. 7 are different between the readout area 601 and the readout area 602 in accordance with the global motion 211 (that is, in accordance with the position of the readout area). The magnification m is 0.5 for all of the readout areas.

The shake corrected image generation unit 213 generates a distortion corrected image corresponding to the readout area 602 of the reference frame 212. Specifically, the shake corrected image generation unit 213 obtains a point (x, y) in a hemispherical field-of-view image 600 corresponding to a point (u, v) in the distortion corrected image using the expression (1) and the expression (2) described with reference to FIG. 7, and reads out a corresponding pixel value in the readout area 602. The shake corrected image generation unit 213 outputs the distortion corrected image generated in this manner as a shake corrected image 214.

Incidentally, the coordinate of an intersection 701 between the field of view vector 705 and the hemispherical surface 704 in FIG. 7 is expressed by the following expressions.

$$x_{\alpha\beta} = R \cdot \sin\beta \cdot \cos\alpha \quad (14)$$

$$y_{\alpha\beta} = R \cdot \sin\beta \cdot \sin\alpha \quad (15)$$

$$z_{\alpha\beta} = R \cdot \cos\beta \quad (16)$$

Figure 6:
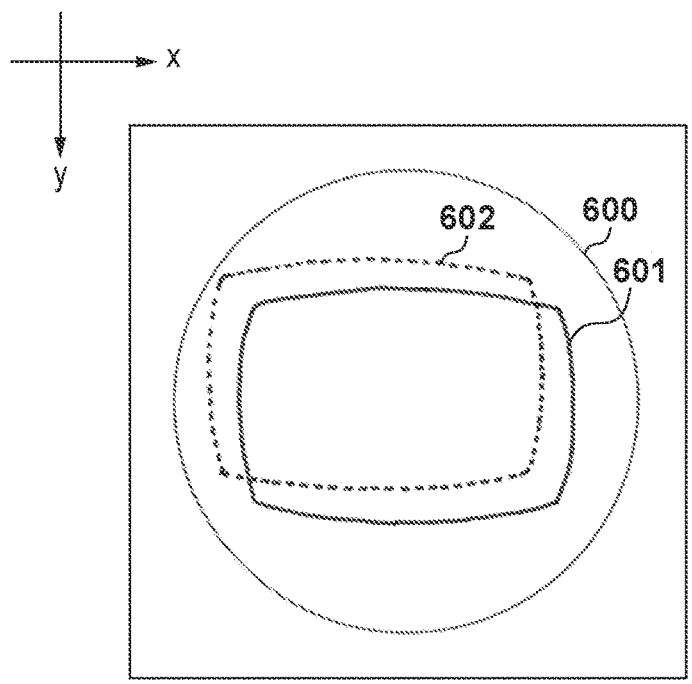
FIG. 6 is a diagram for describing a readout area of a reference frame 212 read by a shake corrected image generation unit 213.

Here, a point $(x_{\alpha\beta}, y_{\alpha\beta})$ on an image surface is hereinafter referred to as an object surface origin position.

Where in the next frame an object surface origin $(x_{\alpha\beta}, y_{\alpha\beta})$ of the current readout area 601 in FIG. 6 will move can be calculated from the affine transformation matrix calculated by the global motion calculation unit 210 in FIG. 2. Specifically, an object surface origin $(x_{\alpha\beta}', y_{\alpha\beta}')$ of the next readout area 602 is calculated from the object surface origin $(x_{\alpha\beta}, y_{\alpha\beta})$ of the current readout area 601 and the affine transformation expression (the expression (3)). Furthermore, the azimuth angle α' and zenith angle β' of the next readout area 602 can be calculated from the object surface origin $(x_{\alpha\beta}', y_{\alpha\beta}')$ by using the expression (14) and the expression (15).

In this embodiment, the magnification m of the shake corrected image 214 is 0.5, and the magnification m of images for detecting a local motion vector (the target distortion corrected image 204 and the reference distortion corrected image 205) is 1. That is, the readout areas 301 to 307 in FIG. 3 are smaller than the readout areas 601 and 602 in FIG. 6. This enables the difficulty of the block matching processing to be decreased by maintaining a narrow angle of view for the images for detecting a local motion vector, while ensuring a wide angle of view for the shake corrected image 214.

Note that, in general, the shake corrected image generation unit 213 generates a distortion corrected image (first image) corresponding to the readout area 601 of the current frame (target frame), before generating the distortion corrected image (second image) corresponding to the readout area 602 of the reference frame 212. Between these two distortion corrected images, movement of the readout areas cancels out movement of the subject, and thus shake correction is realized. In addition, in this embodiment, description was given in which the shake corrected image generation unit 213 outputs a distortion corrected image as the shake corrected image 214, but the shake corrected image generation unit 213 may output the images of the readout areas 601 and 602 without performing distortion correction.

Next, shake corrected image generation processing that is executed by the digital camera 100 will be described with reference to FIG. 8. The processing of each step in this flowchart can be executed by the control unit 101 controlling each of the blocks of the digital camera 100 (in particular, the image processing unit 107) in accordance with an operation program stored in the ROM 102, unless particularly stated otherwise.

In step S801, the vector detection image generation unit 203 obtains the target frame 201 and the reference frame 202. In step S802, the vector detection image generation unit 203 respectively generates the target distortion corrected image 204 and the reference distortion corrected image 205 from the target frame 201 and the reference frame 202. In step S803, the local motion vector detection unit 206 detects the local motion vector 207 from the target distortion corrected image 204 and the reference distortion corrected image 205. In step S804, the motion vector conversion unit 208 converts the local motion vector 207 corresponding to the uv coordinate system of the distortion corrected image into the xy coordinate system of the hemispherical field-of-view image, thereby generating the converted motion vector 209 in which the influence of distortion correction is removed. In step S805, the global motion calculation unit 210 calculates the global motion 211 from the converted motion vector 209. In step S806, the shake corrected image generation unit 213 identifies the readout area 602 of the reference frame 212 (FIG. 6) based on the global motion 211, and generates the shake corrected image 214 corresponding to the readout area 602.

As described above, according to the first embodiment, the digital camera 100 generates a plurality of distortion corrected images corresponding to a plurality of readout areas, for each of the target frame 201 and the reference frame 202. The digital camera 100 then detects a plurality of local motion vectors based on these distortion corrected images, and converts the coordinate system of the plurality of local motion vectors into the coordinate system before distortion correction.

Therefore, more appropriate motion vectors can be generated for a captured image that is distorted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese patent Application No. 2015-082060, filed Apr. 13, 2015 which is hereby incorporated by reference herein in its entirety.

What is claimed is:

1. An image processing apparatus comprising:
one or more processors configured to execute one or more programs so as to function as units comprising:
(1) an acquisition unit configured to acquire a first captured image and a second captured image generated by photo-electrically converting a subject image formed by an optical system;
(2) a generation unit configured to generate N distortion corrected images, N being an integer greater than or equal to 2, by performing coordinate conversion on each of N partial areas of the first captured image, using a conversion parameter that depends on a position of the partial area, and to generate N distortion corrected images by performing coordinate conversion on each of corresponding N partial areas of the second captured image, using a conversion parameter that depends on a position of the partial area;
(3) a detection unit configured to detect N motion vectors by comparing each of the N distortion corrected images generated from the first captured image with the corresponding distortion corrected image generated from the second captured image; and
(4) a conversion unit configured to generate N converted motion vectors by performing inverse coordinate conversion on each of the N motion vectors, using a conversion parameter that depends on a position of the corresponding partial area.

2. The image processing apparatus according to claim 1, wherein the one or more processors further function as units comprising:
an output unit configured to output a first image corresponding to a first partial area of the first captured image; and
an identification unit configured to identify a second partial area corresponding to a movement destination of the first partial area in the second captured image based on the N converted motion vectors,
wherein the output unit outputs a second image corresponding to the second partial area of the second captured image.

3. The image processing apparatus according to claim 2, wherein the output unit generates a first distortion corrected image as the first image by performing coordinate conversion on the first partial area, using a conversion parameter that depends on a position of the first partial area, and generates a second distortion corrected image as the second image by performing coordinate conversion on the second partial area, using a conversion parameter that depends on a position of the second partial area.

4. The image processing apparatus according to claim 2, wherein the identification unit calculates the movement destination of the first partial area based on an affine transformation of the N converted motion vectors.

5. The image processing apparatus according to claim 2, wherein each of the N partial areas of the first captured image is smaller than the first partial area, and
wherein each of the N partial areas of the second captured image is smaller than the second partial area.

6. The image processing apparatus according to claim 1, wherein the first captured image and the second captured image are circular images corresponding to a hemispherical field of view, and
wherein the conversion parameter include an azimuth angle and a zenith angle.

7. An image capturing apparatus comprising:
(A) one or more processors configured to execute one or more programs so as to function as units comprising:
(1) an acquisition unit configured to acquire a first captured image and a second captured image generated by photo-electrically converting a subject image formed by an optical system;
(2) a generation unit configured to generate N distortion corrected images, being an integer greater than or equal 2, to by performing coordinate conversion on each of N partial areas of the first captured image, using a conversion parameter that depends on a position of the partial area, and to generate N distortion corrected images by performing coordinate conversion on each of corresponding N partial areas of the second captured image, using a conversion parameter that depends on a position of the partial area;

(3) a detection unit configured to detect N motion vectors by comparing each of the N distortion corrected images generated from the first captured image with the corresponding distortion corrected image generated from the second captured image; and (4) a conversion unit configured to generate N converted motion vectors by performing inverse coordinate conversion on each of the N motion vectors, using a conversion parameter that depends on a position of the corresponding partial area; and (B) an image capturing unit configured to photo-electrically convert a subject image formed by the optical system.

8. A control method of an image processing apparatus, comprising:

acquiring a first captured image and a second captured image generated by photo-electrically converting a subject image formed by an optical system;

generating N distortion corrected images, N being an integer greater than or equal to 2, by performing coordinate conversion on each of N partial areas of the first captured image, using a conversion parameter that depends on a position of the partial area;

generating N distortion corrected images by performing coordinate conversion on each of corresponding N partial areas of the second captured image, using a conversion parameter that depends on a position of the partial area;

detecting N motion vectors by comparing each of the N distortion corrected images generated from the first captured image with the corresponding distortion corrected image generated from the second captured image; and generating N converted motion vectors by performing inverse coordinate conversion on each of the N motion vectors, using a conversion parameter that depends on a position of the corresponding partial area.

9. A non-transitory computer-readable storage medium which stores a program for causing a computer to execute a control method comprising:

acquiring a first captured image and a second captured image generated by photo-electrically converting a subject image formed by an optical system;

generating N distortion corrected images, N being an integer greater than or equal to 2, by performing coordinate conversion on each of N partial areas of the first captured image, using a conversion parameter that depends on a position of the partial area;

generating N distortion corrected images by performing coordinate conversion on each of corresponding N partial areas of the second captured image, using a conversion parameter that depends on a position of the partial area;

detecting N motion vectors by comparing each of the N distortion corrected images generated from the first captured image with the corresponding distortion corrected image generated from the second captured image; and generating N converted motion vectors by performing inverse coordinate conversion on each of the N motion vectors, using a conversion parameter that depends on a position of the corresponding partial area.

* * * * *